Patented June 17, 1930

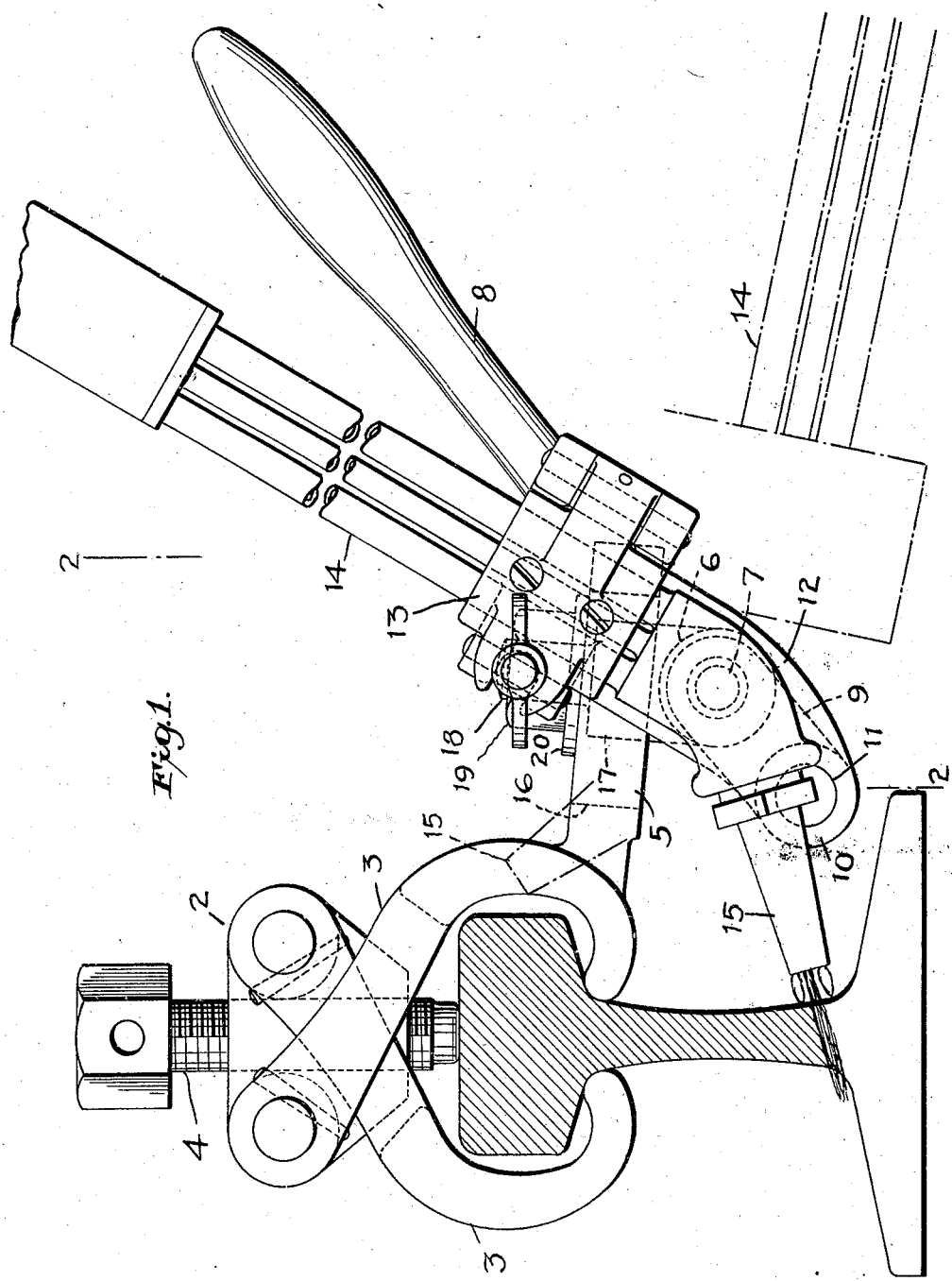

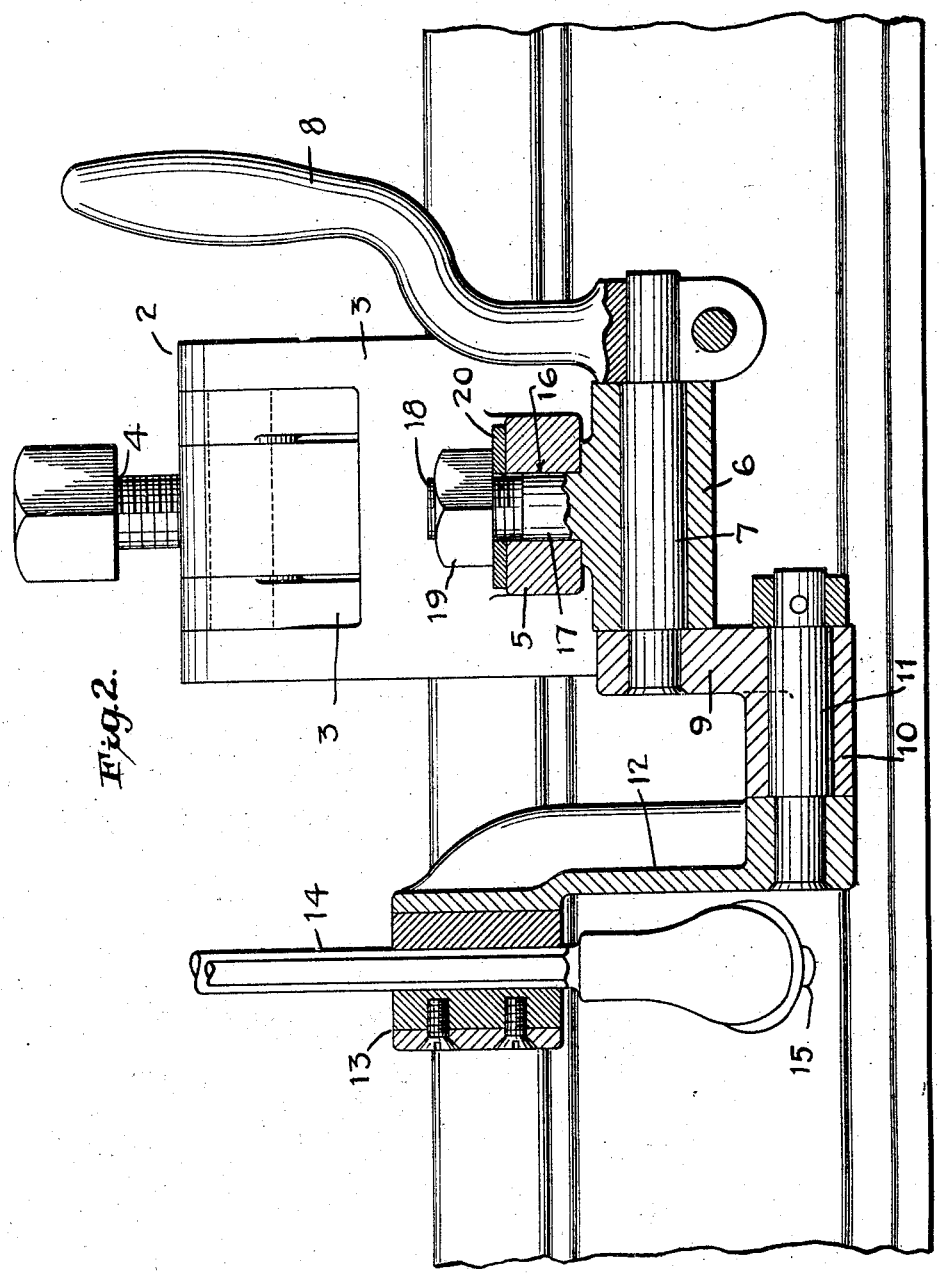

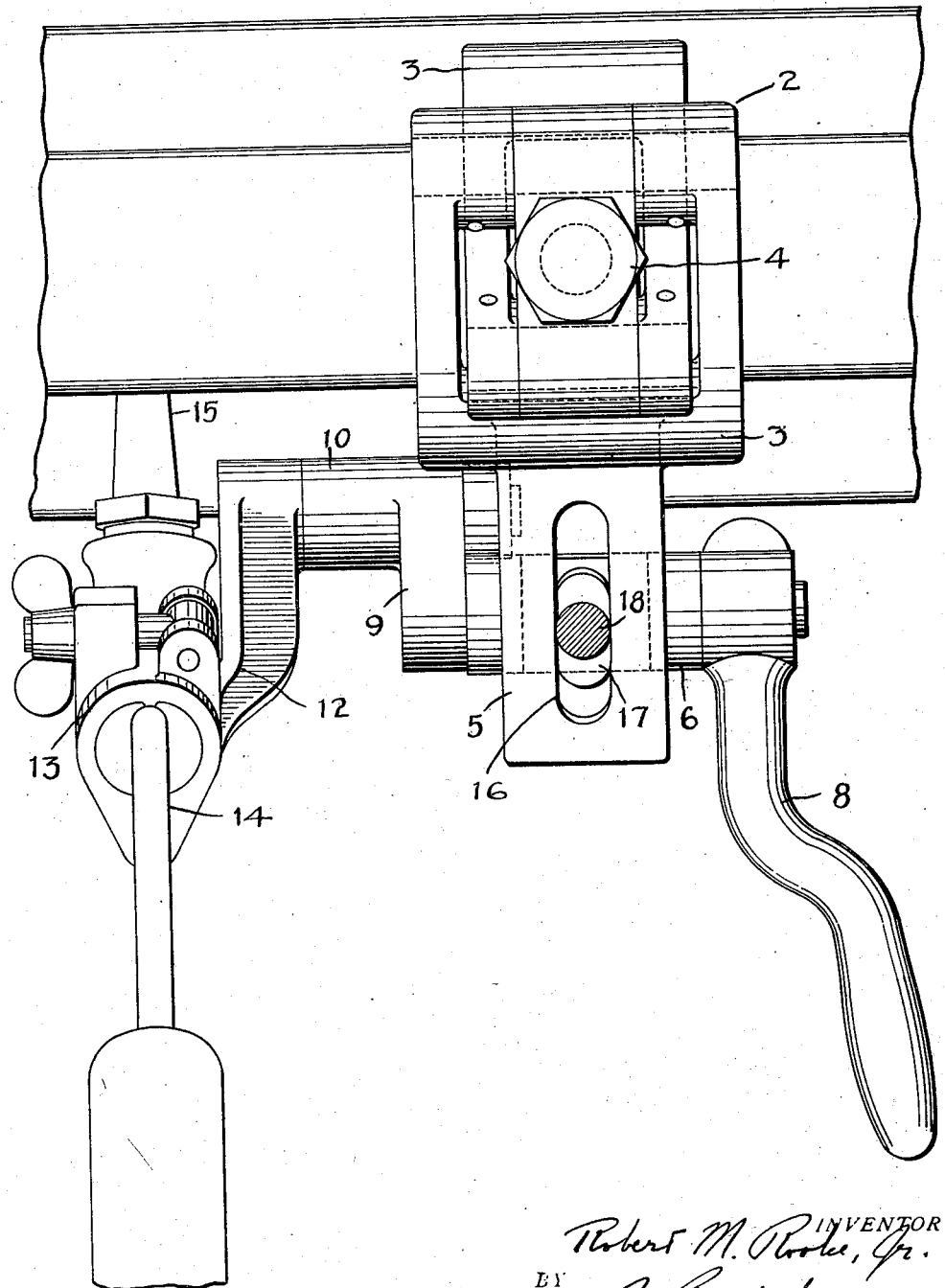

1,764,471

UNITED STATES PATENT OFFICE

ROBERT M. ROOKE, JR., OF JERSEY CITY, NEW JERSEY, ASSIGNOR TO AIR REDUCTION COMPANY, INCORPORATED, OF NEW YORK, N. Y., A CORPORATION OF NEW YORK

RAIL-CUTTING APPLIANCE

Application filed December 1, 1928. Serial No. 323,076.

The invention relates to appliances for cutting rails or other irregular shapes by means of a cutting torch. The object is to provide a device of great simplicity with which the jets can be moved and directed by hand operation to follow the particular contour at varying rates of motion and cut the section with nicety. I have found that by carrying the torch from a support clamped to the rail, through two successively connected members movable in parallel planes, or in the same plane, one of which members, at least, is a rocking member, and by manipulating the two members through separate adjacent handles by use of two hands, the operator can very readily compound the movements in varying manner so as to move the jets in effective cutting relation to the flange, web and ball of the rail, and change the direction and rate of motion and the angularity of the jets as required at the different portions of the section.

In the accompanying drawings, forming part hereof:

Fig. 1 is a side elevation of the appliance attached to a rail, the rail being shown in section and partly cut through, and portions of the torch being broken away, two positions of the torch being indicated in full and broken lines, respectively;

Fig. 2 is a section taken on an irregular line in the general region of the lines 2—2 of Fig. 1; and Fig. 3 is a plan view, with a portion in section, portions of the torch being broken away.

The device includes a suitable clamp for application to the shape. A clamp 2 having pivoted, crossing, hooked jaws 3, adapted to engage under the ball of a rail, and tightened on top by a screw 4, is preferably employed.

A rigid arm 5 projects laterally from one of the jaws for some distance to one side of the position of the rail, this arm carrying at its under side a fixed bearing 6. A pivot or journal 7 is freely turnable in this bearing, and on one end of this journal there is secured a lever handle 8. The other end of the journal has fixed to it an arm 9 which carries a movable bearing 10, which is parallel with, and in offset relation to, the bearing 6.

A second pivot or journal 11 is held so as to be freely turnable in the bearing 10, and an arm 12 projecting from this journal carries a torch-holder clamp 13. These parts are so arranged that, with the shank of a cutting torch 14 clamped in the holder 13, the extremity of the torch tip 15 is movable in proper relation to the contour of the rail.

The handle of the torch, extending above the holder 13, is made to serve as a second manipulating handle. After lighting the torch, the operator grasps the two handles in his two hands, and by simultaneous coordinated movements, either of which may be intermitted as necessary, causes the jets to travel inward across one flange, cutting through the entire base of the rail, across the web, cutting that, and outwardly under and partly up one side of the ball, so as to cut through the entire ball. During the operation, the angle of the jets is varied as the result of the motions imparted to the torch. The jets not being confined to a predetermined path, or regulated as to rate of displacement, the operator is free to move them, so as to secure the best effect. In this way, it is possible with very little skill to make perfect and rapid cuts, which cleanly sever the rail.

Means are provided for setting the movable system nearer to or farther from the side of the shape, depending upon the particular size and contour. To this end the arm 5 is preferably provided with a longitudinal slot 16, in which is received a flat-sided projection 17 formed on top of the fixed bearing 6. A screw-threaded stud 18 rising from this projection and a nut 19 on this stud serve to clamp the arm between the bearing and a washer 20 under the nut. On loosening this nut, the fixed bearing can be shifted toward or from the rail, after which tightening of the nut will fix the bearing in the desired position.

While a preferred embodiment has been described in detail, it will be understood that various changes and modifications are within the scope of the invention as set forth in the claims.

I claim:

1. An appliance for cutting of rails and other irregular shapes by means of jets of cutting gases, comprising a support adapted to be applied to the article to be cut, only two freely jointed members which are operable to move the jets, the first of said members being movably mounted on the support, and the second member being pivoted to the first member and carrying the jet-delivering means, and two manually operable handles operatively connected, respectively, with the two members, in order that the operator by simultaneously manipulating the two handles can cause the jets to follow the contour of the shape.

2. An appliance for cutting of rails and other irregular shapes by means of jets of cutting gases, comprising a support adapted to be applied to the article to be cut, only two freely jointed members which are operable to move the jets, the first of said members being pivoted on said support and the second member being pivoted to the first on an axis which is offset from the axis on which the first member is pivoted, said second member comprising a torch-holder, and a handle connected to the first member, in order that the operator by simultaneously manipulating said handle and the handle of the torch can turn the first member relatively to the support and the second member relatively to the first and thereby cause the jets to follow the contour of the shape.

ROBERT M. ROOKE, Jr.